United States Patent [19]

Ahrens

[11] Patent Number: 4,922,858
[45] Date of Patent: May 8, 1990

[54] ANIMAL WATERER

[75] Inventor: Claude W. Ahrens, Grinnell, Iowa

[73] Assignee: Ahrens Agricultural Industries Co., Grinnell, Iowa

[21] Appl. No.: 312,174

[22] Filed: Feb. 21, 1989

[51] Int. Cl.⁵ ............................................. A01K 7/00
[52] U.S. Cl. ..................................... 119/73; 119/75
[58] Field of Search ............... 119/72, 73, 78, 81, 119/75, 79, 80

[56] References Cited

U.S. PATENT DOCUMENTS

| | | | |
|---|---|---|---|
| 232,077 | 9/1880 | Shaw et al. | |
| 439,597 | 8/1883 | Schafer et al. | 119/73 |
| 1,359,885 | 11/1920 | Fullerton | |
| 1,922,901 | 8/1933 | Ruppel | 220/24 |
| 2,087,173 | 7/1937 | Uden | 137/68 |
| 2,512,839 | 6/1950 | Pruitt | 119/81 |
| 3,150,639 | 8/1964 | Sereda | 119/78 |
| 3,745,977 | 7/1973 | Martin | 119/73 |
| 3,835,882 | 9/1974 | Barker et al. | 137/445 |
| 4,003,340 | 1/1987 | Kuzura et al. | 119/73 |
| 4,100,885 | 7/1978 | Kapplinger | 119/73 |
| 4,320,720 | 3/1982 | Streed | 119/73 |
| 4,440,112 | 4/1984 | Lilyerd | 119/73 |
| 4,509,460 | 4/1985 | Selter | 119/78 |
| 4,559,905 | 12/1985 | Ahrens | 119/73 |
| 4,570,576 | 2/1986 | Noland et al. | 119/73 |
| 4,646,687 | 3/1987 | Peterson et al. | 119/73 |
| 4,739,727 | 4/1988 | Boyer | 119/73 |
| 4,813,378 | 3/1989 | Lapp | 119/73 |

Primary Examiner—Paul J. Hirsch
Attorney, Agent, or Firm—Zarley, McKee, Thomte, Voorhees & Sease

[57] ABSTRACT

An energy free animal waterer includes a base unit having an upstanding tube in which a ballast connected to a cable moves for normally pivoting a closure valve upwardly into engagement with an access opening in a top unit mounted on the base unit. The mechanism for opening and closing the closure valve is totally independent of the water in the reservoir and the top unit such that freezing of the water will not render the closure valve inoperative and the unit may be easily assembled and disassembled.

6 Claims, 1 Drawing Sheet

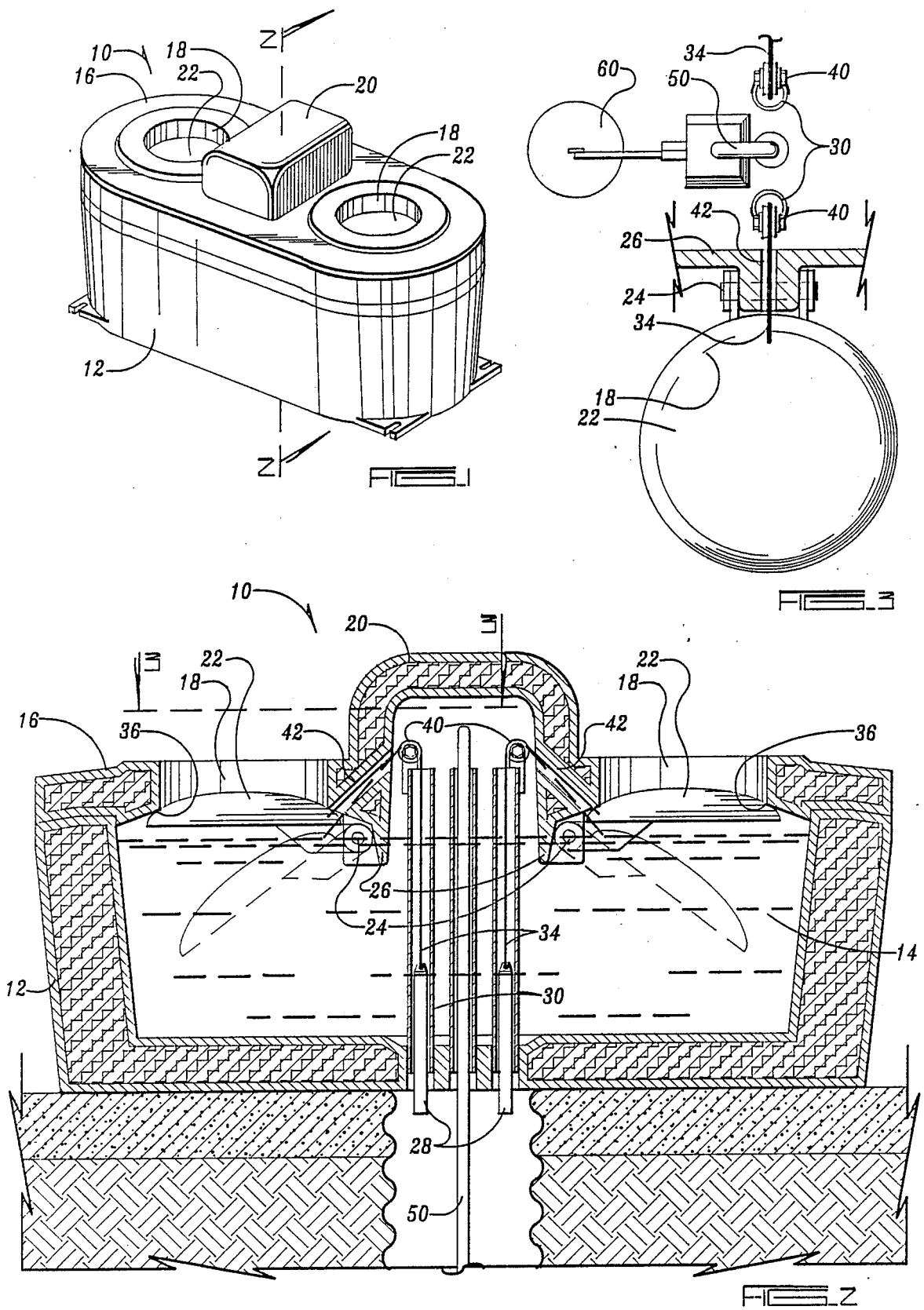

ANIMAL WATERER

BACKGROUND OF THE INVENTION

The Martin patent U.S. Pat. No. 3,745,977 and my patent U.S. Pat. No. 4,559,905 utilize the buoyancy of the water to close an access opening into the water reservoir by the upward buoyant force being applied to the closure element seated in the access opening. Should the water freeze, the closure element would become inoperative as it would be immovable in the ice.

While the buoyant closure element is insulated, it will still transmit some heat from the water reservoir to the atmosphere outside the animal waterer due to its contact with the water in the reservoir.

Ritchie Industries, Inc. Conrad, Iowa sells an animal waterer having a ballast positioned in the water in the water reservoir connected to a cable which extends over a pulley mounted in the top section of the waterer which in turn extends downwardly into engagement with a closure element. This waterer suffers from numerous problems. The ballast in the water is subject to freezing and becoming inoperative. Should debris collect in the water reservoir the ballast will not be free to move and consistently maintain the valve or the closure element in a closed position. The pulley being mounted in the top unit makes it awkward assembling and disassembling the animal waterer when the top is removed and assembled. The cable will also be subject to corrosion due to being in the water.

SUMMARY OF THE INVENTION

The animal waterer of this invention includes a base unit and a top unit. A pivotal closure valve is mounted in the base unit and is normally pivoted upwardly to a closed position in an access opening in the top unit. A ballast element is provided in an upstanding tube in the base unit and a cable extends upwardly over a pulley in the base unit and thence downwardly to the closure valve element to exert an upward pull on the valve element. The valve element is positioned out of the water and thus freezing of the water will not render the valve element inoperative. The cable and the ballast are totally isolated from the water and the tube in which the cable extends is in communication with the ground whereby heat from the ground is transmitted into the water reservoir to help raise its temperature and prevent freezing. The top unit may be removed easily for inspection and repair since all component parts are located in the base unit.

DESCRIPTION OF THE DRAWINGS

FIG. 1 is a perspective view of an animal waterer.
FIG. 2 is a cross sectional view taken along line 2—2 in FIG. 1.
FIG. 3 is a cross sectional view taken along line 3—3 in FIG. 2.

DESCRIPTION OF THE PREFERRED EMBODIMENT

The animal waterer of this invention is referred to generally by the reference numeral 10 in FIG. 1 and includes a base unit 12 having a water reservoir 14. A top unit 16 is positioned on the base unit 12 and includes access openings 18 on opposite sides of a center dome 20.

An insulated closure valve 22 is mounted in the base unit 12 by a pivot pin 24 which pivots it to a ledge 26 extending across the reservoir 14.

An elongated ballast element 28 is vertically movable in a tube 30 in the base unit 12. The ballast 28 is connected by a cable 34 to the top of the closure valve 22 at a point remote to the pivot pin 24 to normally pull the valve closure element 22 upwardly into the engagement with a valve seat 36 in the access opening 18 of the top unit 16. The cable 34 extends over a pulley 40 supported by the tube 30. The cable 34 extends downwardly in a groove 42 in the top of the ledge 26.

An inlet water pipe 50 extends from the ground upwardly through the base unit 12 into the dome 20 and water in the reservoir 14 is maintained at a predetermined level below the closure valve 22 by a float 60.

It is thus seen in operation that the closure valve 22 operates totally independently of the water in the water reservoir 14. The ballast 28 and cable 34 and pulley 40 are isolated from the water and may be expected to operate more reliably. The desired upward force on the closure valve 22 may be carefully selected and matched with the animal that is using the animal waterer. It is desired to maintain the closure valve 22 closed at all times when not being used but the downward pressure required by the animal should not be so great that it will discourage the animal from seeking and obtaining the necessary water.

Debris build up such as dirt collecting in the bottom of the water reservoir 14 will have no adverse effect on the operation of the closure valve 22 since its operation is above and independent of anything that may collect on the bottom of the reservoir. The top unit 16 may be easily removed and reassembled without disturbing the operation of the closure element 22, cable 34, pulley 40 and ballast 28 as they are all positioned and supported in the base unit 12. It is thus seen that a fool-proof maintenance free animal waterer has been provided.

What is claimed is:
1. An animal watering tank comprising:
a base unit including a water reservoir having a water level;
a top unit positioned on said base unit over said water reservoir and having an access opening into said reservoir;
a closure valve pivoted to said base unit under said top unit for opening and closing said access opening in said top unit;
an upstanding tube in said base unit having an interior isolated from water in said reservoir; and
a ballast element in said tube connected to said valve to exert an upward pull thereon to normally maintain said valve in said closed position but operable to pivot downwardly to said open position in response to downward pressure on said closure valve from an animal seeking water.
2. The structure of claim 1 wherein said water level in said reservoir is spaced below said closure valve whereby freezing of said water does not render said closure valve inoperative.
3. The structure of claim 1 wherein a pulley is positioned above the said tube and a cable extends from said ballast in said tube over said pulley to said closure valve at a point spaced from its pivotal connection to said base unit.
4. The structure of claim 3 wherein said base unit includes a ledge extending over said reservoir and said closure valve is mounted on said ledge.
5. The structure of claim 4 wherein said ledge includes a groove in which said cable extends from said pulley to said closure valve.
6. The structure of claim 1 wherein said tube is open at its lower end and is in communication with the ground whereby ground heat will rise in said tube and warm the interior of said reservoir.

* * * * *